United States Patent
Nakajima et al.

(10) Patent No.: US 7,262,793 B2
(45) Date of Patent: Aug. 28, 2007

(54) IMAGER AND IMAGE QUALITY CORRECTING METHOD PERFORMING CORRECTION BASED ON THE OUTPUT OF DIFFERENT READOUT MODES

(75) Inventors: Ken Nakajima, Tokyo (JP); Nobuyuki Sato, Tokyo (JP); Satoshi Mitsui, Aichi (JP)

(73) Assignee: Sony Corporation, Tokyo (JP)

( * ) Notice: Subject to any disclaimer, the term of this patent is extended or adjusted under 35 U.S.C. 154(b) by 614 days.

(21) Appl. No.: 10/433,232

(22) PCT Filed: Sep. 20, 2002

(86) PCT No.: PCT/JP02/09715

§ 371 (c)(1),
(2), (4) Date: May 21, 2004

(87) PCT Pub. No.: WO03/032630

PCT Pub. Date: Apr. 17, 2003

(65) Prior Publication Data

US 2004/0212689 A1    Oct. 28, 2004

(30) Foreign Application Priority Data

Oct. 3, 2001   (JP) .............................. 2001-307921

(51) Int. Cl.
H04N 5/225 (2006.01)
H04N 3/14 (2006.01)
H04N 5/222 (2006.01)

(52) U.S. Cl. ............... 348/220.1; 348/312; 348/333.01

(58) Field of Classification Search .............. 348/222.1, 348/312, 317, 320, 322, 333.01, 220.1, 221.1; 396/374

See application file for complete search history.

(56) References Cited

U.S. PATENT DOCUMENTS 6,204,879 B1 *   3/2001   Koseki et al. ............... 348/320

(Continued)

FOREIGN PATENT DOCUMENTS

EP            0 774 865          5/1997

(Continued)

*Primary Examiner*—John M. Villecco
(74) *Attorney, Agent, or Firm*—Frommer Lawrence & Haug LLP; William S. Frommer; Thomas F. Presson

(57) ABSTRACT

An image-capturing apparatus, in which solid-state image-capturing elements having a large number of pixels are used, capable of suitably performing image-quality correction on a captured image. In a monitor reading mode, a camera system LSI (6) detects the read image signal which is read by thinning out pixels by an image-capturing device (3). Based on the detected data, control values for image-quality correction are computed in a microcomputer (9), and the camera system LSI (6) performs an image-quality correction process on the image signal based on these control values. When the image-capturing device shifts to a capture reading mode, the camera system LSI (6) temporarily stores the image signal, in which all the pixels are read, in the image memory (7), thereafter reads the image signal and detects it. The microcomputer (9) computes a control value on the basis of this detected data and the detected data in the previously used monitor reading mode. Thereafter, the camera system LSI (6) reads the image signal again, and performs an image-quality correction process on the basis of the control values by the microcomputer (9).

9 Claims, 13 Drawing Sheets

U.S. PATENT DOCUMENTS

| | | | |
|---|---|---|---|
| 6,342,921 B1 * | 1/2002 | Yamaguchi et al. | 348/322 |
| 6,556,242 B1 * | 4/2003 | Dunton et al. | 348/220.1 |
| 6,710,807 B1 * | 3/2004 | Yamagishi | 348/221.1 |
| 6,710,808 B1 * | 3/2004 | Yamagishi | 348/221.1 |
| 6,963,374 B2 * | 11/2005 | Nakamura et al. | 348/220.1 |
| 7,126,635 B1 * | 10/2006 | Oochi | 348/220.1 |
| 7,161,625 B2 * | 1/2007 | Hori | 348/222.1 |
| 2002/0196348 A1 * | 12/2002 | Kubo | 348/220.1 |
| 2003/0122952 A1 * | 7/2003 | Kuroiwa | 348/222.1 |
| 2003/0160874 A1 * | 8/2003 | Kuroiwa | 348/220.1 |
| 2005/0253934 A1 * | 11/2005 | Yamagishi et al. | 348/222.1 |
| 2006/0152595 A1 * | 7/2006 | Ryu et al. | 348/220.1 |

FOREIGN PATENT DOCUMENTS

| | | |
|---|---|---|
| EP | 0 794 662 | 9/1997 |
| JP | 9-135388 | 5/1997 |
| JP | 9-298693 | 11/1997 |
| JP | 2000-201355 | 7/2000 |
| JP | 2001-69526 | 3/2001 |
| JP | 2001-86394 | 3/2001 |
| JP | 2001197371 A * | 7/2001 |
| JP | 2002-218479 | 8/2002 |
| JP | 2002-218480 | 8/2002 |

* cited by examiner

FIG. 4A
FIG. 4B
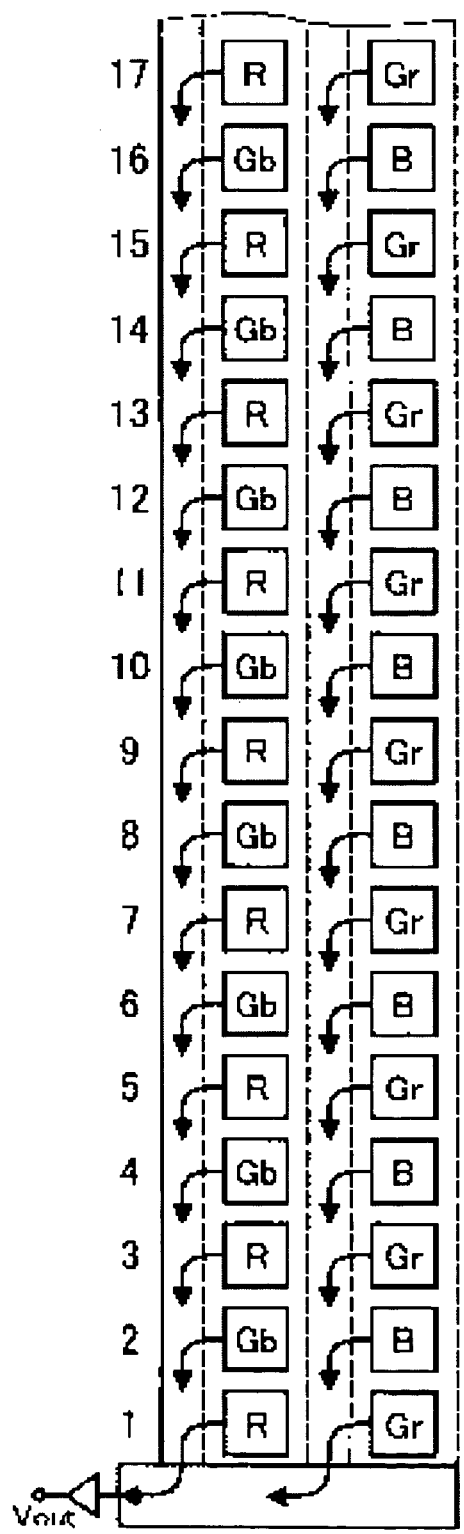
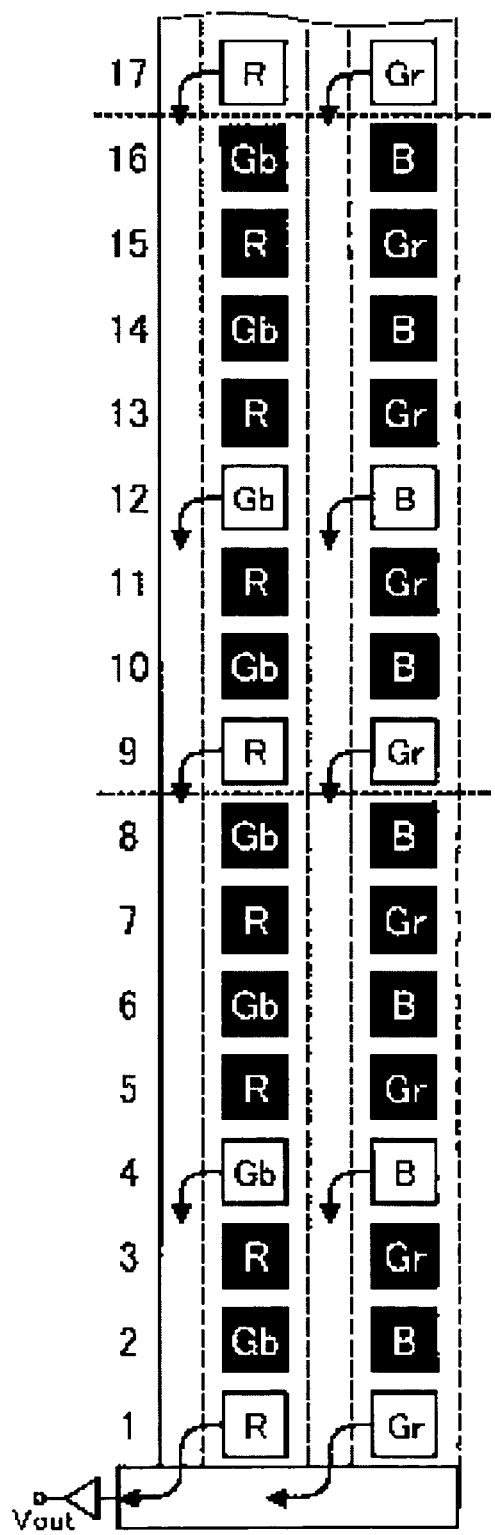

FIG. 5A
FIG. 5B
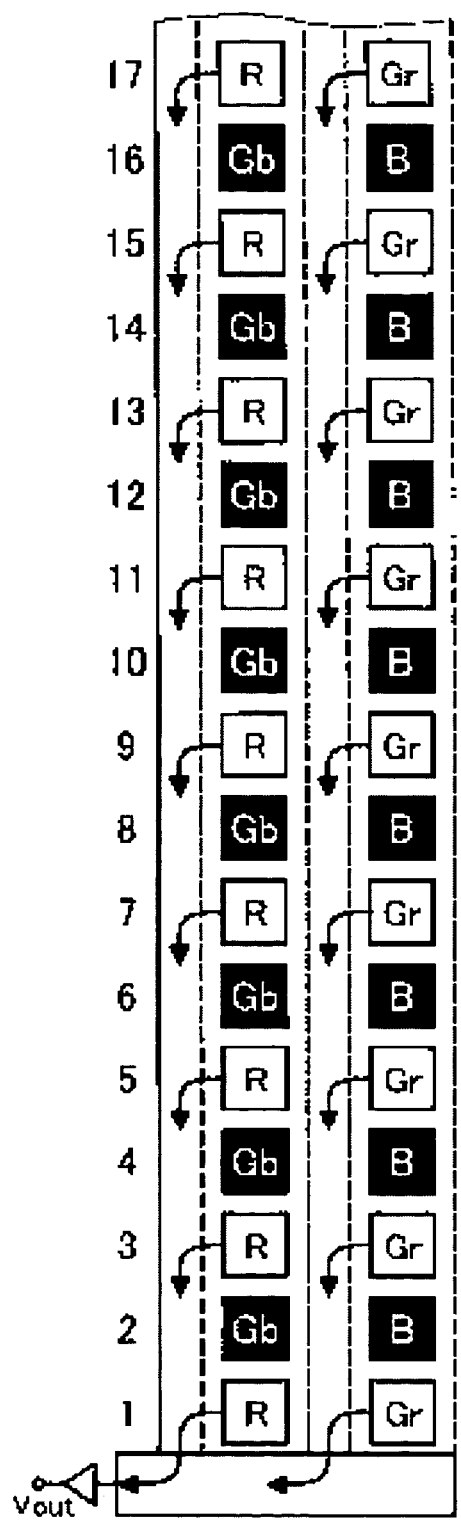
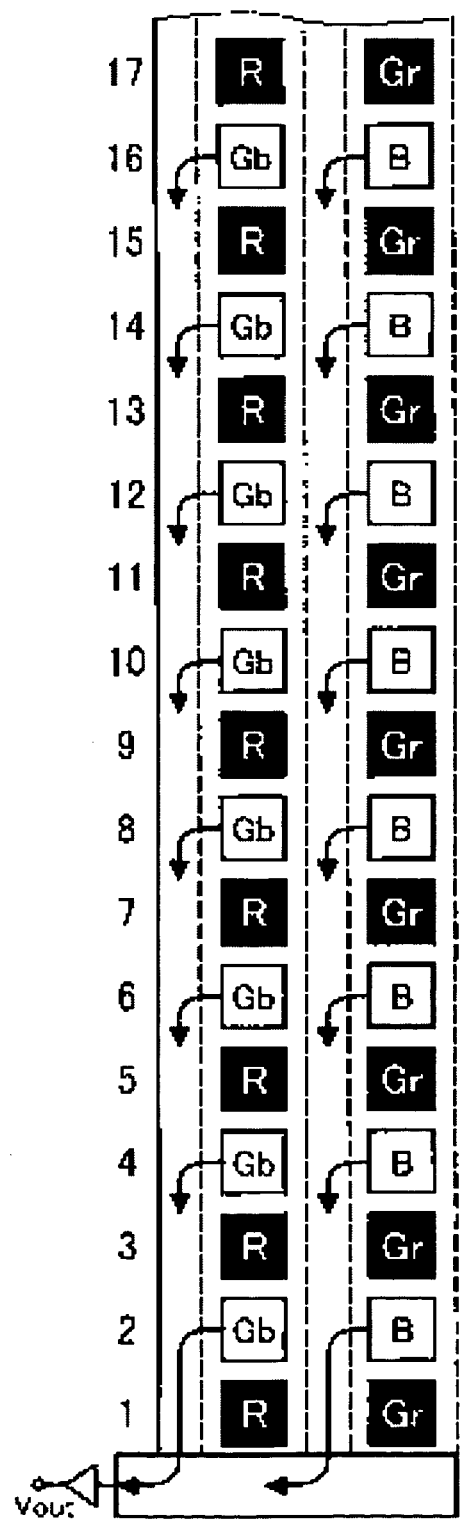

AMOUNT OF OFFSET
R_CLP
Gr_CLP
Gb_CLP
B_CLP

GAIN COEFFICIENT

IMAGER AND IMAGE QUALITY CORRECTING METHOD PERFORMING CORRECTION BASED ON THE OUTPUT OF DIFFERENT READOUT MODES

TECHNICAL FIELD

The present invention relates to an image-capturing apparatus for capturing an image of a subject by using solid-state image-capturing elements and to an image-quality correction method used during this image capture.

BACKGROUND ART

In recent years, digital still cameras for storing captured images as digital data have become popular. In a digital still camera, an image captured by optical lenses is photoelectrically converted into digital data by using an image-capturing device such as a CCD (Charge-Coupled Device) or a CMOS (Complementary Metal Oxide Semiconductor) image sensor, after which predetermined signal processing is performed thereon, and the data is recorded on an external recording medium, etc.

As signal processing for a captured-image signal, automatic control, such as AE (Auto Exposure) for performing an appropriate exposure, AWB (Auto White Balance) for performing color correction according to the color temperature, and DCLP (Digital Clamp) for removing offset contained in the image signal, is performed. Detection for the above automatic control is performed based on the image signal which is read from the image-capturing device by thinning out pixels. Such an image signal is normally used as display data on an LCD (Liquid-Crystal Display) for monitoring during image capture by a user. Therefore, the reading operation mode that performs thinned-out reading is called a "monitor reading mode".

In contrast, a reading operation mode that reads a signal from an image-capturing device without thinning out pixels is called a "frame reading mode" in the case of an interlace scanning method, and is called an "all-pixels reading mode" in the case of a progressive scanning method. These are collectively referred to as a "capture reading mode".

FIG. 14 schematically shows an example of signal processing as the reading operation mode shifts in a conventional digital still camera.

FIG. 14 shows a case in which a CCD of an interlace scanning method is used as an image-capturing device. Part (A) of FIG. 14 shows a synchronization signal synchronized with the frame or the field. Part (B) of FIG. 14 shows the shift of the reading operation mode in the CCD. Parts (C) and (D) of FIG. 14 show the flow of a detection process and an image generation process for control of AE, AWB, and DCLP corresponding to the above shift, respectively. The detection process and the image generation process in parts (C) and (D) of FIG. 14 are performed by, for example, a camera block LSI.

At timings T1401 and T1402, as shown in part (B) of FIG. 14, the CCD operates in the monitor reading mode, and performs reading of signals, in which pixels are thinned out, in synchronization with the synchronization signal. The image signal obtained by the monitor reading mode is converted into digital data, after which, as shown in part (C) of FIG. 14, in the camera system LSI, detection for control of AE, AWB, and DCLP is performed. The data obtained by this detection is passed to, for example, a microcomputer, whereby coefficients for control of AE, AWB, and DCLP are computed, and these coefficients are output to the camera system LSI.

In the camera system LSI, as shown in part (D) of FIG. 14, based on the computed coefficients, an appropriate image-quality correction process is performed on the image signal obtained in the monitor reading mode, a process for conversion into a predetermined image data format is performed, and thus a process for generating an image signal for monitor (hereinafter referred to as a "monitor image signal") is performed. The generated monitor image signal is stored in an image memory such as DRAM (Dynamic Random Access Memory), after which the monitor image signal is output to a display block, whereby it is displayed on a display device such as an LCD, so that monitoring by the user is performed.

The user adjusts the angle of view of the subject by using a display device, and the display image at this time requires a high frame rate. The monitor reading mode is a reading operation mode for generating a monitor image signal having a small amount of information by reading the signal by thinning out pixels in the CCD.

Next, at timing T1402, when, for example, a shutter switch is pressed by the user, the CCD is placed in the capture reading mode, and first, reading of signals is performed from all the pixels of the odd-numbered lines in the horizontal direction. At the subsequent timing T1403, reading of signals is performed from all the pixels of the even-numbered lines. In the capture reading mode, since pixels are not thinned out, the interval of the synchronization signal increases. The image signal obtained by the capture reading mode is converted into digital data, and this data is temporarily stored in the image memory.

Next, at timing T1404, the CCD returns to the monitor reading mode. Along with this, the image signal obtained by the capture reading mode is read from the image memory, this image signal is supplied to the camera system LSI, and a process for generating an image signal to be recorded on, for example, an external recording medium (hereinafter referred to as a "captured image signal") is started. As shown in part (D) of FIG. 14, in the camera system LSI, by using various coefficients obtained from the image signal in the monitor reading mode prior to timing T1402 at which the shutter switch is pressed, correction processes, such as AE, AWB, and DCLP, for the image signal from the memory is performed by open control, and furthermore, a data conversion process is performed thereon, thereby generating a captured image signal. The generated captured image signal is again stored in the image memory, after which the signal is transferred to an external recording medium.

Thereafter at timing T1405, in the camera block LSI, the captured image signal generation process is terminated, and a detection for the image signal obtained in the monitor reading mode is started again.

As described above, in the conventional digital still camera, control of AE, AWB, and DCLP is performed on the image signal which is captured during the capture reading mode by using various coefficients obtained by detection in the monitor reading mode which is prior to the above capture reading mode. This results from being based on the concept that is constructed on the assumption that, conventionally, the camera signal processing and the detection process are performed in real time. That is, this is because, even if detection for the image signal which is output after the shutter is pressed is performed, the time to compute the data obtained by the detection using a microcomputer is required, and the camera signal processing cannot be performed in real time on the basis of this computed value.

Furthermore, in the conventional digital still camera, there is no large difference between the image signal which is read as a result of thinning out pixels in the monitor reading mode and the image signal which is read without thinning out pixels. Even if the detection is performed in the monitor reading mode, and a correction process is performed, based on open control, on the image signal obtained in the capture reading mode by using the various computed coefficients, a severe problem with the image quality of the captured image does not occur.

However, recently, since the number of pixels of the CCD has been increasing, the difference between the image signal obtained by the monitor reading mode and the image signal obtained by the capture reading mode has become large, and in the conventional method, correction processes of AE, AWB, and DCLP for the captured image cannot be performed appropriately.

For example, in the image-capturing device, the amount of a dark signal which occurs becomes larger according to the exposure time and the temperature, and as the number of pixels increases, the time it takes to read the image signal in the capture reading mode increases, causing noise components due to the dark signal generated in the image-capturing apparatus at that time to be increased. As a result, in the image signal obtained in each of the monitor reading mode and the capture reading mode, since the offsets which are contained therein differ greatly, in the image-quality correction process based on the detection in the monitor reading mode, a problem arises in that an appropriate image signal cannot be generated.

Furthermore, as the number of pixels increases, the ratio of thinning out pixels in the monitor reading mode must be increased so that the frame rate of the display image for monitoring by the user is not decreased. As a result, a conspicuous aliasing occurs at the space sampling on the image-capturing device. As one method for preventing this aliasing, a method of adding lines of the same color in the vertical direction on the image-capturing apparatus is becoming more common. However, in this method, for the image signal in the monitor reading mode, the amount of the output signal becomes two times as large due to the line addition. Therefore, during signal processing for the captured image, the process of correcting the captured image signal in which line addition is not performed is performed by using the data based on the detection of the image signal in which line addition is performed, thus making it difficult to perform proper control.

In addition to the problem involved with the increase of the number of pixels, in the correction process of AE, AWB, and DCLP, there are other conventional problems. For example, in the monitor reading mode, generally, an image is captured while the mechanical shutter is open. At this time, a so-called smear may occur in the signal output from the image-capturing device. In contrast, in the capture reading mode, a mechanical shutter is often used. In this case, a smear does not occur from the viewpoint of principles. Therefore, there can be cases in which a clear difference occurs between the image signals generated in the two reading operation modes.

Furthermore, a digital still camera often has a strobe mechanism installed therein. This strobe mechanism does not operate during monitor before an image is captured, that is, in the monitor reading mode, and operates only in the capture reading mode in which an image is captured. Therefore, based on the detection for the image signal in which strobe light is not emitted, the image signal in which strobe light is emitted is corrected, and it is impossible to perform accurate control from the viewpoint of principles.

The present invention has been made in view of such problems. An object of the present invention is to provide an image-capturing apparatus capable of appropriately performing image-quality correction on a captured image using solid-state image-capturing elements having a large number of pixels.

Another object of the present invention is to provide an image-quality correction method capable of suitably performing image-quality correction on a captured image using solid-state image-capturing elements having a large number of pixels.

DISCLOSURE OF INVENTION

To overcome the above-mentioned problems, the present invention provides an image-capturing apparatus for capturing an image of a subject, the image-capturing apparatus comprising: solid-state image-capturing elements arranged in matrix comprising a first reading operation mode in which a captured-image signal is read by thinning out pixels, and a second reading operation mode in which the captured image signal is read without thinning out pixels; temporary storage means for temporarily storing an image signal read from the solid-state image-capturing elements during the second reading operation mode; detection means for performing a predetermined detection on the image signal read from the solid-state image-capturing elements during the first reading operation mode and performing a predetermined detection on the image signal read from the temporary storage means during the second reading operation mode; signal processing means for performing predetermined signal processing for correcting image quality on the basis of the data detected by the detection means during each of the reading operation modes, on the image signal read from the solid-state image-capturing elements during the first reading operation mode and on the image signal read from the temporary storage means during the second reading operation mode; and reading control means for, when the solid-state image-capturing elements shift from the first reading operation mode to the second reading operation mode, reading the image signal stored in the temporary storage means and supplying the image signal to the detection means, thereafter, re-reading the image signal, and supplying the image signal to the signal processing means.

In such an image-capturing apparatus, when the solid-state image-capturing elements are in the first reading operation mode, the image signal which is read from the solid-state image-capturing elements by thinning out the pixels is detected by the detection means, and based on this detected data, the signal processing means performs predetermined signal processing for image-quality correction. Furthermore, when the solid-state image-capturing elements shift to the second reading operation mode, the image signal which is read from the solid-state image-capturing elements without thinning out the pixels is temporarily stored in the temporary storage means, after which the image signal is read from the temporary storage means and is supplied to the detection means under the control of the reading control means. Thereafter, the image signal is read again from the temporary storage means and is supplied to the signal processing means under the control of the reading control means. Then, the signal processing means performs signal processing for image-quality correction of this image signal on the basis of the detection for the image signal which is read in the second reading operation mode. Furthermore, for example, during the second reading operation mode, when the image signal stored in the temporary storage means is to be read and supplied to the detection means, the reading control means may read the image signal by thinning out the pixels in such a manner as to correspond to the reading from the solid-state image-capturing elements during the first reading operation mode.

Furthermore, the present invention provides an image-capturing method for capturing an image of a subject by using solid-state image-capturing elements, the image-quality correction method comprising the steps of: performing a predetermined detection on an image signal which is read from the solid-state image-capturing elements in a first reading operation mode in which the image signal captured by the solid-state image-capturing elements is read by thinning out pixels; performing predetermined signal processing for correcting image quality on the image signal on the basis of the data detected by the predetermined detection; temporarily storing the image signal read from the solid-state image-capturing elements when the solid-state image-capturing elements shift to a second reading operation mode without thinning out the pixels; reading the stored image signal and performing the predetermined detection thereon; and re-reading the stored image signal and performing predetermined signal processing for image-quality correction on the re-read image signal on the basis of the data detected by the predetermined detection.

In such an image-quality correction method, when the solid-state image-capturing elements shift from the first reading operation mode to the second reading operation mode, the image signal which is read from the solid-state image-capturing elements without being thinned out is temporarily stored, after which the image signal is read, and predetermined detection is performed thereon. Thereafter, the temporarily stored image signal is read again, and based on the detection for the image signal which is read in the second reading operation mode, predetermined signal processing for image-quality correction is performed on this image signal. Furthermore, for example, when the temporarily stored image signal is to be read and predetermined detection is to be performed thereon, the image signal may be read by thinning out the pixels in such a manner as to correspond to the reading from the solid-state image-capturing elements during the first reading operation mode.

BRIEF DESCRIPTION OF THE DRAWINGS

FIGS. 4A and 4B show an example of reading signals in the image-capturing device in the progressive scanning method.

FIGS. 5A and 5B show an example of reading signals in the image-capturing device in the interlace scanning method.

BEST MODE FOR CARRYING OUT THE INVENTION

The embodiments of the present invention will now be described below with reference to the drawings.

Figure 1:
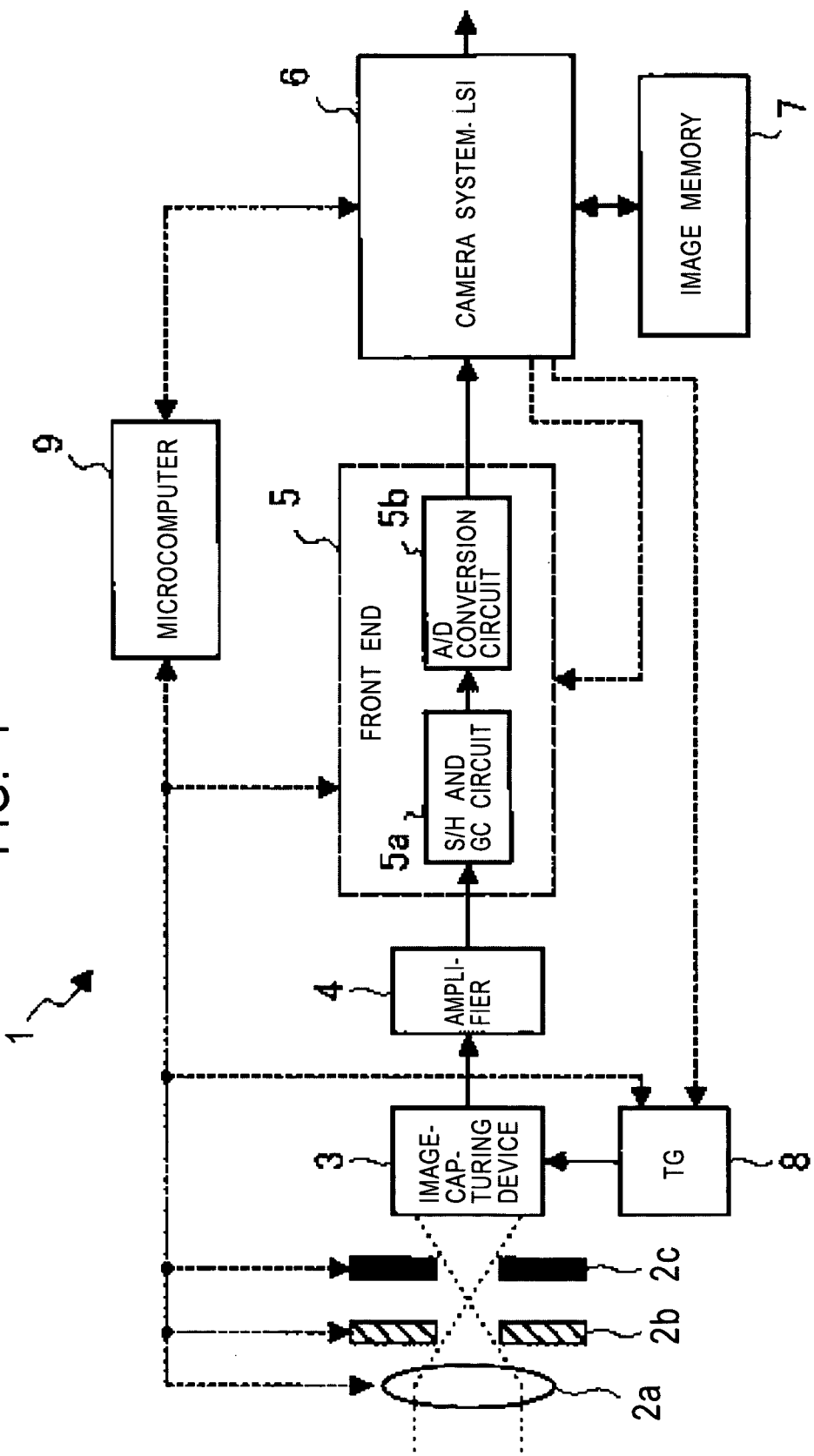
FIG. 1 is a block diagram showing an example of the configuration of an image-capturing apparatus of the present invention.

FIG. 1 is a block diagram showing an example of the configuration of an image-capturing apparatus of the present invention. An image-capturing apparatus 1 shown in FIG. 1 is an apparatus for capturing an image of a subject and generating image data of a digital system. The image-capturing apparatus 1 comprises a lens 2a, an iris 2b, and a shutter 2c, for receiving light from the subject, an image-capturing device 3 for photoelectrically converting this light, an amplifier 4 for driving an analog image signal from the image-capturing device 3, a front end 5 for performing a process such as conversion of an analog image signal into digital data, a camera system LSI 6 for performing an image-quality correction process on the image signal which has been converted into digital data and a process for conversion into a luminance signal and color-difference signals, an image memory 7 for storing an image signal output from the camera system LSI 6, a TG (Timing Generator) 8 for driving the image-capturing device 3, and a microcomputer 9 for controlling the entire apparatus.

The lens 2a is movable along the optical axis, and correctly collects light from the subject into the image-capturing device 3. The iris 2b controls the amount of light supplied to the image-capturing device 3 by varying the area through which the collected light passes. The shutter 2c controls the exposure in the image-capturing device 3 by blocking the transmission of light. There are cases in which the iris 2b also serves the function of the shutter 2c. The operations of the lens 2a, the iris 2b, and the shutter 2c are controlled by the microcomputer 9.

The image-capturing device 3 is configured in such a manner that, for example, a large number of solid-state image-capturing elements, such as CCDs and CMOS image sensors, are integrated in matrix. The image-capturing device 3 converts light from the subject into an electrical signal, and outputs the signal as a current value or a voltage value. Furthermore, the image-capturing device 3 comprises a reading operation mode in which stored charge is read for all the pixels for one frame or one field in one scanning, and a reading operation mode in which stored charge is read by thinning out pixels. Hereafter, the former is called a "capture reading mode", and the latter is called a "monitor reading mode".

Furthermore, in order to remove aliasing components of the signal during space sampling, resulting from the fact that the ratio of thinning out pixels in the monitor reading mode is high, the image-capturing device 3 has a function for adding the signals of the lines of the same color and outputting them with regard to the pixels in the vertical direction in the image-capturing device 3 during the monitor reading mode.

The amplifier 4 drives an analog image signal from the image-capturing device 3 and supplies the analog image signal to the front end 5.

The front end 5 comprises an S/H (Sample/Hold) and GC (Gain/Control) circuit 5a and an A/D conversion circuit 5b. The S/H and GC circuit 5a performs by a correlated double sampling process a noise elimination process for commonly called 1/F fluctuation noise, etc., on the analog image signal which is supplied via the amplifier 4, and further performs gain adjustment as necessary. For example, when the intensity of light incident on the image-capturing device 3 is weak, the input image signal is amplified under the control of the microcomputer 9. The A/D conversion circuit 5b converts a signal from the S/H and GC circuit 5a into a digital image signal, and supplies the digital image signal to the camera system LSI 6.

The camera system LSI 6 detects an image signal from the front end 5 under the control of the microcomputer 9, and while a writing/reading operation for writing and reading this image signal into and from the image memory 7 is performed, the camera system LSI 6 performs image-quality correction processes such as white-balance adjustment and offset elimination, and a process for converting the image signal into a luminance signal and color-difference signals. Furthermore, the image signal which is generated after undergoing such processes is output to the display block of a display device (not shown) or a writing block of an external recording medium. Furthermore, a synchronization signal is output to the front end 5 and the TG 8.

The image memory 7 is a semiconductor memory of, for example, DRAM or SDRAM (Synchronous-DRAM), and temporarily stores an image signal of a digital system from the camera system LSI 6.

The TG 8 controls the driving timing in the horizontal and vertical directions under the control of the microcomputer 9 in the image-capturing device 3. Furthermore, when the image-capturing device 3 has a high-speed/low-speed shutter function, the TG 8 performs exposure time control for this function.

The microcomputer 9 supervises the control of the entire image-capturing apparatus 1. For example, the microcomputer 9 performs control, such as amount-of-exposure control by the iris 2b, exposure-time control by open/close control for the shutter 2c, control of a reading operation mode (to be described later) in the image-capturing device 3, gain control in the S/H and GC circuit 5a of the front end 5, operation control and computation of a control value for the camera system LSI 6, control of an electronic shutter function of the image-capturing device 3 by the TG 8, etc.

Figure 2:
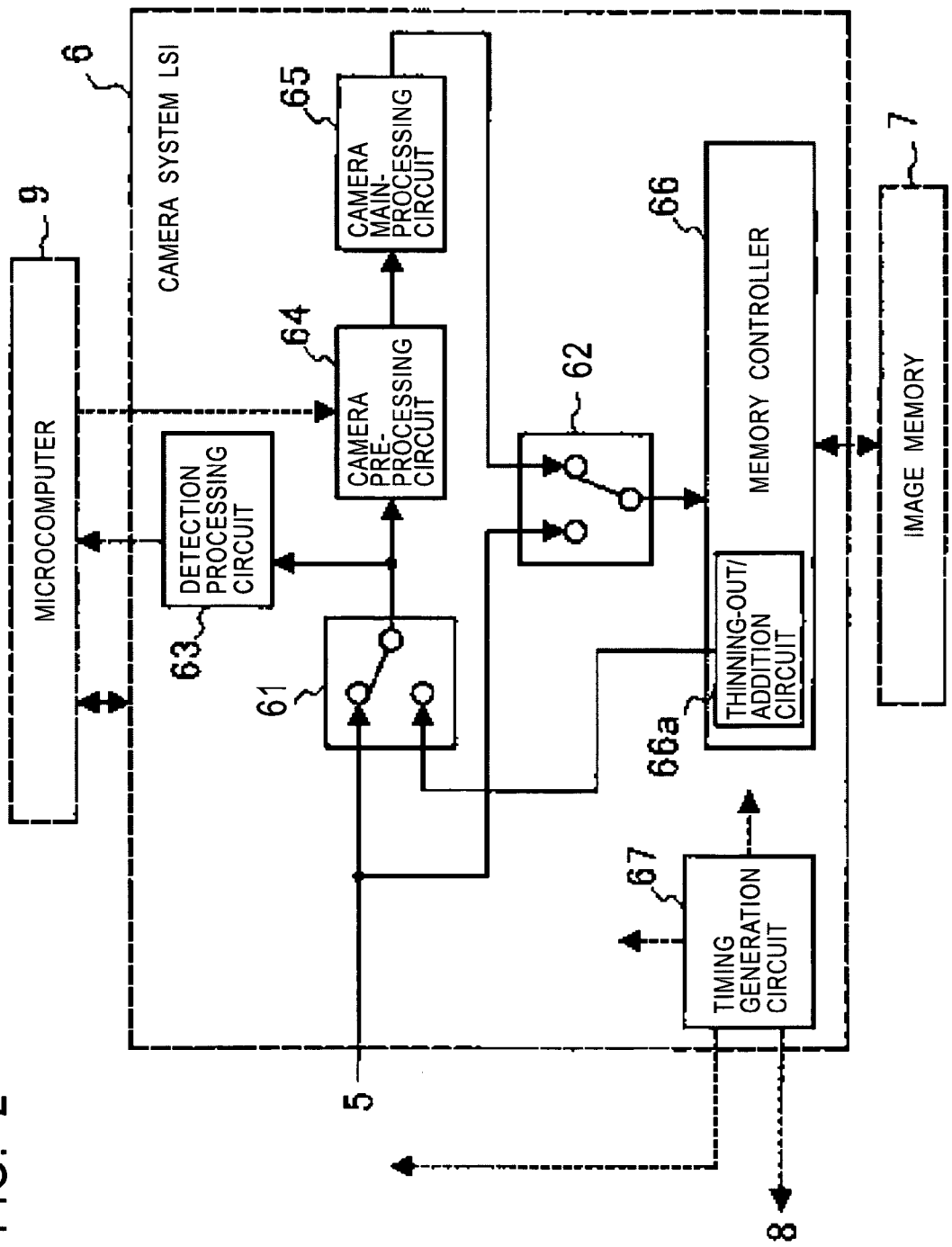
FIG. 2 is a block diagram showing an example of the internal configuration of a camera system LSI.

Next, the internal configuration of the camera system LSI 6 will be described below in detail. FIG. 2 is a block diagram showing an example of the internal configuration of the camera system LSI 6.

The camera system LSI 6 comprises data bus selectors 61 and 62 for switching the inputs of image signals, a detection processing circuit 63 for detecting an input image signal, a camera pre-processing circuit 64 for performing signal processing, such as an image-quality correction process, on the input image signal, a camera main-processing circuit 65 for performing a process for converting the input image signal into a luminance signal and color-difference signals, a memory controller 66 for controlling writing and reading data into and from the image memory 7, and a timing generation circuit 67 for generating a timing signal in circuits within the camera system LSI 6.

The data bus selector 61 switches an input to the detection processing circuit 63 and the camera pre-processing circuit 64 between the image signal from the front end 5 and the image signal from the image memory 7 via the memory controller 66 in accordance with a control signal from the microcomputer 9. Furthermore, the data bus selector 62 switches an input to the memory controller 66 between the image signal from the front end 5 and the image signal from the camera main-processing circuit 65.

The detection processing circuit 63 performs detection for performing control of AE, AWB, and DCLP on the image signal input from the data bus selector 61. For example, the detection processing circuit 63 performs a process for integrating luminance signal components within the detection frame for the purpose of AE control, a process for integrating a color-by-color level for the purpose of AWB control, and a process for integrating an offset level of each color in the OPB (Optical Black) area for the purpose of DCLP. The detection processing circuit 63 outputs the detected data obtained by each process to the microcomputer 9.

The camera pre-processing circuit 64 performs an image-quality correction process, such as white balance, DCLP, gain adjustment, y correction, and a clipping process, on the image signal input from the data bus selector 61 in accordance with the control value computed by the microcomputer 9.

The camera main-processing circuit 65 performs a pixel interpolation process, a frequency characteristic correction process, etc., on an image signal composed of, for example, RGB primary-color signals, input from the camera pre-processing circuit 64, so that the image signal is converted into a common image data format formed of a luminance signal (Y) and color-difference signals (Cb/Cr).

The memory controller 66 buffers the image signal supplied from the data bus selector 62, performs addressing of the image memory 7, and stores the image signal in the specified area of the image memory 7 under the control by the microcomputer 9. Furthermore, the memory controller 66 reads the image signal of the specified area and outputs it to the data bus selector 61.

This memory controller 66 incorporates therein a thinning-out/addition circuit 66a. The thinning-out/addition circuit 66a has a function for reading an image signal from the image memory 7 by thinning out pixels when the image signal is to be read from the image memory 7, and a function for adding the image signals of the lines of the same color in the vertical direction in matrix and outputting them. During the thinned-out reading among the above, the reading is performed by making a match with the positions of pixels to be reduced and color coding in such a manner as to correspond to the thinning-out method of the image-capturing device 3 in the monitor reading mode. Also, during the line addition, similarly, the reading is performed in such a manner as to make a match with the line addition and the addition method in the image-capturing device 3 in the monitor reading mode.

The timing generation circuit 67 generates a timing signal which serves as an operation reference for each internal circuit of the front end 5 and the camera system LSI 6, the TG 8, etc.

The image-capturing device 3 of this image-capturing apparatus 1 comprises two reading operation modes, that is, the capture reading mode and the monitor reading mode in the manner described above. The capture reading mode is an operation mode for generating a captured image, and the generated image signal contains data for all the pixels provided in the image-capturing device 3, making it possible to display a high-resolution image.

The monitor reading mode is an operation mode for generating an image signal to be displayed on the display device such as an LCD so that, for example, an angle of view is adjusted by the user before an image is captured. In this monitor reading mode, as a result of reading signals from the image-capturing device 3 by thinning out pixels, the amount of data of the image signal to be generated is reduced, and the frame rate of the display image in the display device can be increased.

Figure 3:
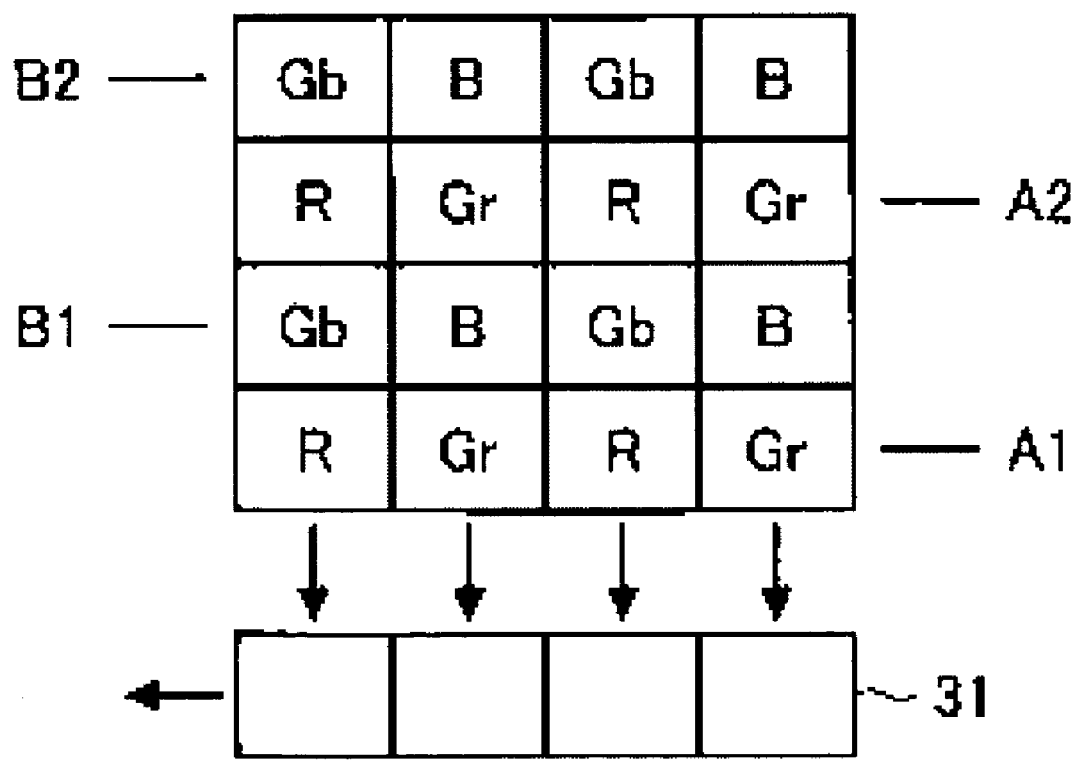
FIG. 3 schematically shows an example of pixel coding in an image-capturing device.

Here, a description will now be given of an example of reading signals in a case where a primary color single-plate CCD is used as the image-capturing device 3. FIG. 3 schematically shows an example of pixel coding in the image-capturing device 3.

In the image-capturing device 3 provided in the image-capturing apparatus 1, for example, as shown in FIG. 3, primary color filters of R, Gr, Gb, and B are located. Gr and Gb indicate a G signal set in the same horizontal line as that of the R signal and the B signal, respectively.

In the progressive scanning method, the pixels in the horizontal lines are stored in sequence in a horizontal register 31, and, for example, as a result of being read in sequence from the left side, the signals of all the pixels are output. Furthermore, in the case of the interlace scanning method, first, the pixels of the odd-numbered lines, such as A1 and A2 in the figure, are read in sequence, after which the pixels of the even-numbered lines, such as B1 and B2, are read in sequence, thereby all the pixels for one frame are output.

A description will now be given below of a signal reading operation in the image-capturing device 3 having such pixel coding. FIGS. 4A and 4B show an example of reading signals in the case of the progressive scanning method.

In the case of the image-capturing device 3 of the progressive scanning method, in the capture reading mode, as shown in FIG. 4A, the signals of all the pixels are read in sequence starting from the first line in the horizontal direction. FIG. 4B shows an example of pixel thinning-out reading in the case of the monitor reading mode. Here, the black filled portions indicate pixels for which reading of signals is not performed. In this example, as a result of reading the image signals of two lines out of eight lines while maintaining the pixel coding like the first line and the fourth line, and the ninth line and the twelfth line, the number of pixels to be read is reduced to ¼.

Next, an example of reading signals in the case of the interlace scanning method will now be described. FIGS. 5A and 5B show an example of reading signals in the capture reading mode in the case of the interlace scanning method.

In the case of the interlace scanning method, the image signals in the image-capturing device 3 are read at intervals of two fields. During the reading of the first field, as shown in FIG. 5A, for example, the image signals of the odd-numbered lines in the horizontal direction are read, and during the next reading of the second field, as shown in FIG. 5B, the image signals of the even-numbered lines are read. The image signal of each field is temporarily stored in the image memory 7, thereby generating the image signals for one frame including all the pixels.

Figure 6:
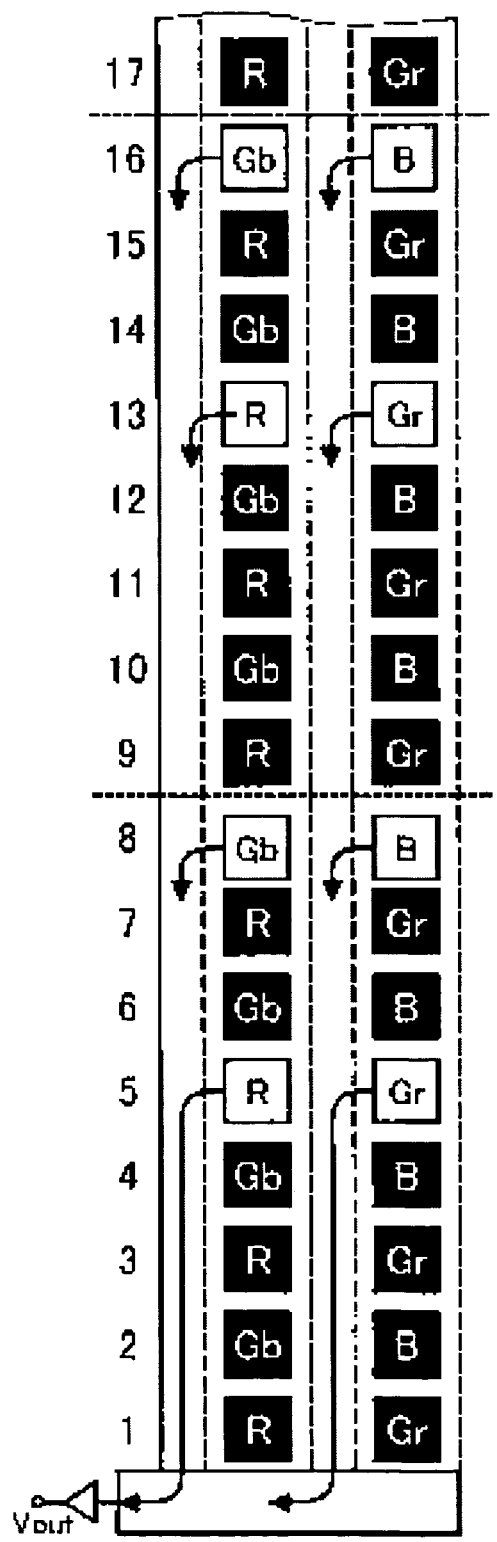
FIG. 6 shows an example of reading a signal in a monitor reading mode in the case of the interlace scanning method.

FIG. 6 shows an example of reading signals in the monitor reading mode in the case of the interlace scanning method.

In the monitor reading mode, in a manner similar to the above-described progressive scanning method, pixel signals for one frame are read in one scanning. In the example of FIG. 6, as a result of reading pixel signals of two lines out of eight lines in the horizontal direction while maintaining the pixel coding, the number of pixels is reduced to ¼.

Furthermore, in the example of reading signals in the monitor reading mode shown in FIGS. 4B and 6, since the pixel signals are read in units of one line, it is necessary to increase the thinning-out ratio as the number of pixels possessed by the image-capturing device 3 becomes larger, the image becomes coarser, and the aliasing during the space sampling becomes likely to occur. Therefore, it is conceived that the image quality is improved by reading in an added manner the pixel signals of the same color in a plurality of lines in the vertical direction.

Figure 7:
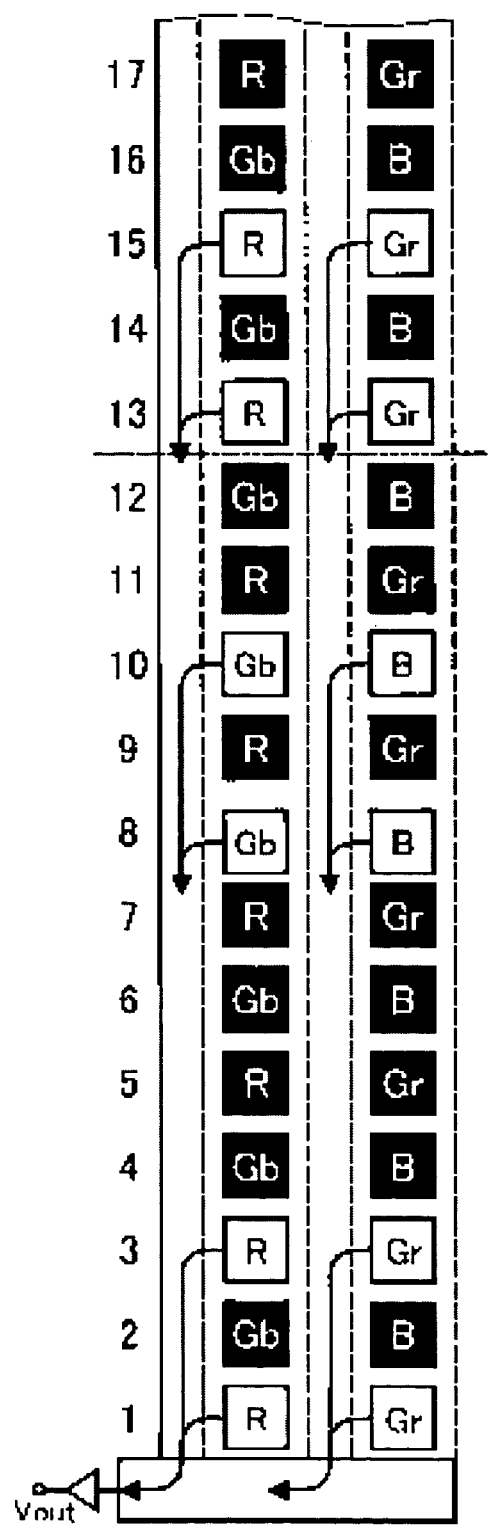
FIG. 7 shows an example of reading signals in a case where line addition is performed in the monitor reading mode.

FIG. 7 shows an example of reading signals in a case where line addition is performed in the monitor reading mode.

In the example of FIG. 7, four lines out of 12 lines in the vertical direction are read, and the signals of the adjacent pixels of the same color in the vertical direction for two lines are added by the horizontal register 31 and are output. For example, for the R signal and the Gr signal, the image signals of the first line and the third line are added and output, and for. the Gb signal and the B signal, the image signals of the eighth line and the tenth line are added and output.

As a result, while the number of pixels to be output is reduced to ⅙ of all the pixels, the amount of video information of ⅓, which is twice that, is reflected in the image, and thus the coarseness of the image due to the thinned-out reading is corrected. Furthermore, as a result of adding the pixel signals of the same color for two lines in the vertical direction, this functions as a band filter, and aliasing noise which appears in the image due to space sampling can be reduced. However, this should be noted that the level of the output image signal becomes two times as high due to this addition.

In the foregoing, although a case in which a primary color single-plate CCD is used as the image-capturing device 3 has been described, when, for example, a 3-plate CCD is used, thinned-out reading may be performed on the image signals for the same number of lines with respect to each color.

In this image-capturing apparatus 1, the camera system LSI 6 performs detection for performing a correction process, such as exposure, white balance, and offset, on the captured image signal under the control of the microcomputer 9. Furthermore, by sending this detected result to the microcomputer 9 and by receiving the input of the computation result, functions of the automatic exposure (AE) correction, the automatic white balance (AWB) correction, and the digital clamp (DCLP) process for removing an offset are realized.

In the monitor reading mode, a detection is performed on the image signal which is read in a thinned-out manner from the image-capturing device 3, and based on this detected data, image-quality correction control is performed. Furthermore, for example, in the capture reading mode, after the shutter button is pressed, conventionally, image-quality correction control is performed based on the detected data in the previous monitor reading mode. However, in the present invention, in addition to the above, a detection is also performed on the image signal which is read in the capture reading mode, thereby improving the accuracy of image-quality correction.

Figure 8:
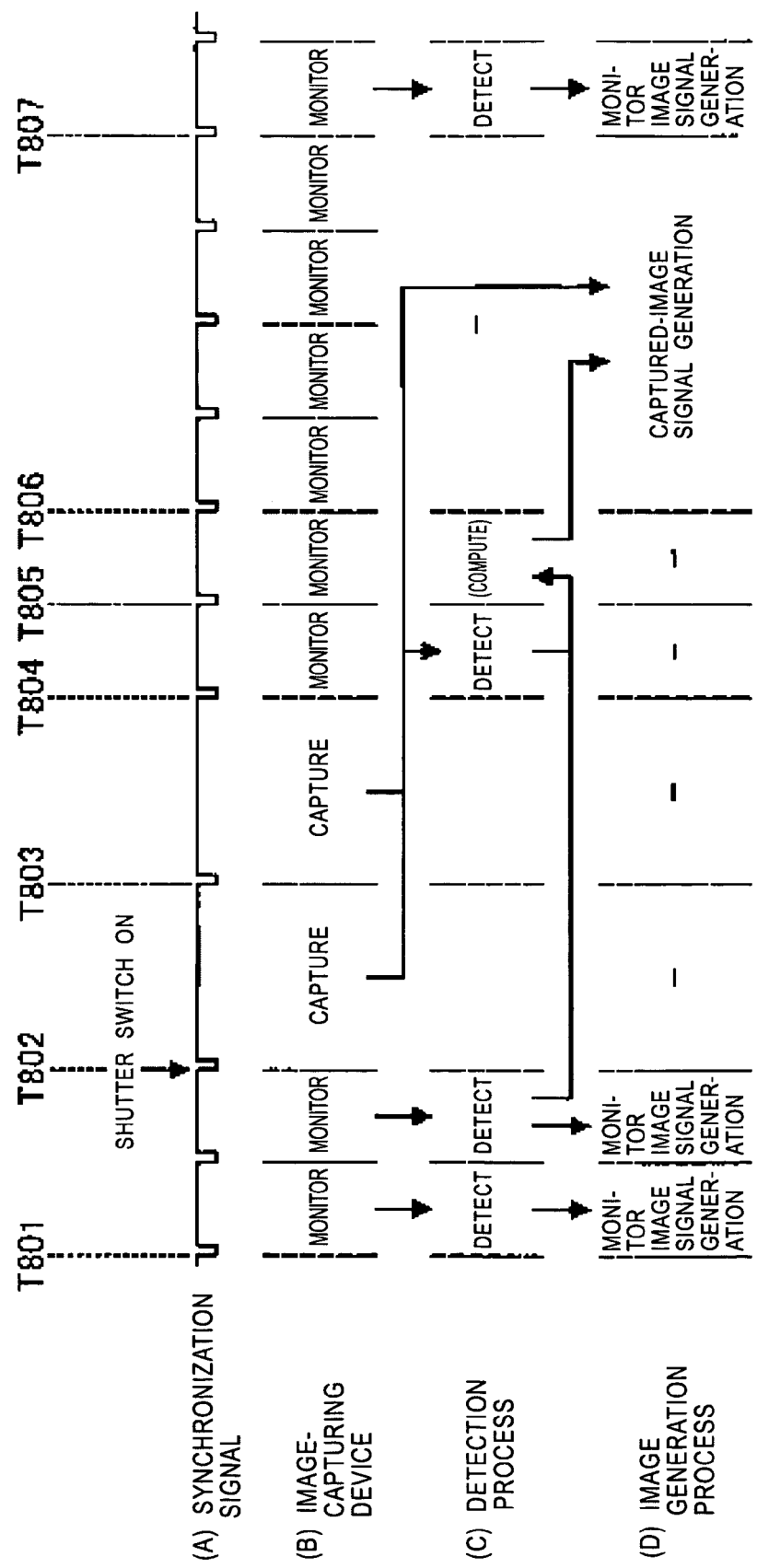
FIG. 8 schematically shows an example of signal processing as the reading operation mode shifts in the image-capturing apparatus of the present invention.

FIG. 8 schematically shows an example of signal processing as the reading operation mode in the image-capturing apparatus 1 shifts. The operation of the image-capturing apparatus 1 will now be described below with reference to FIG. 8.

Figure 14:
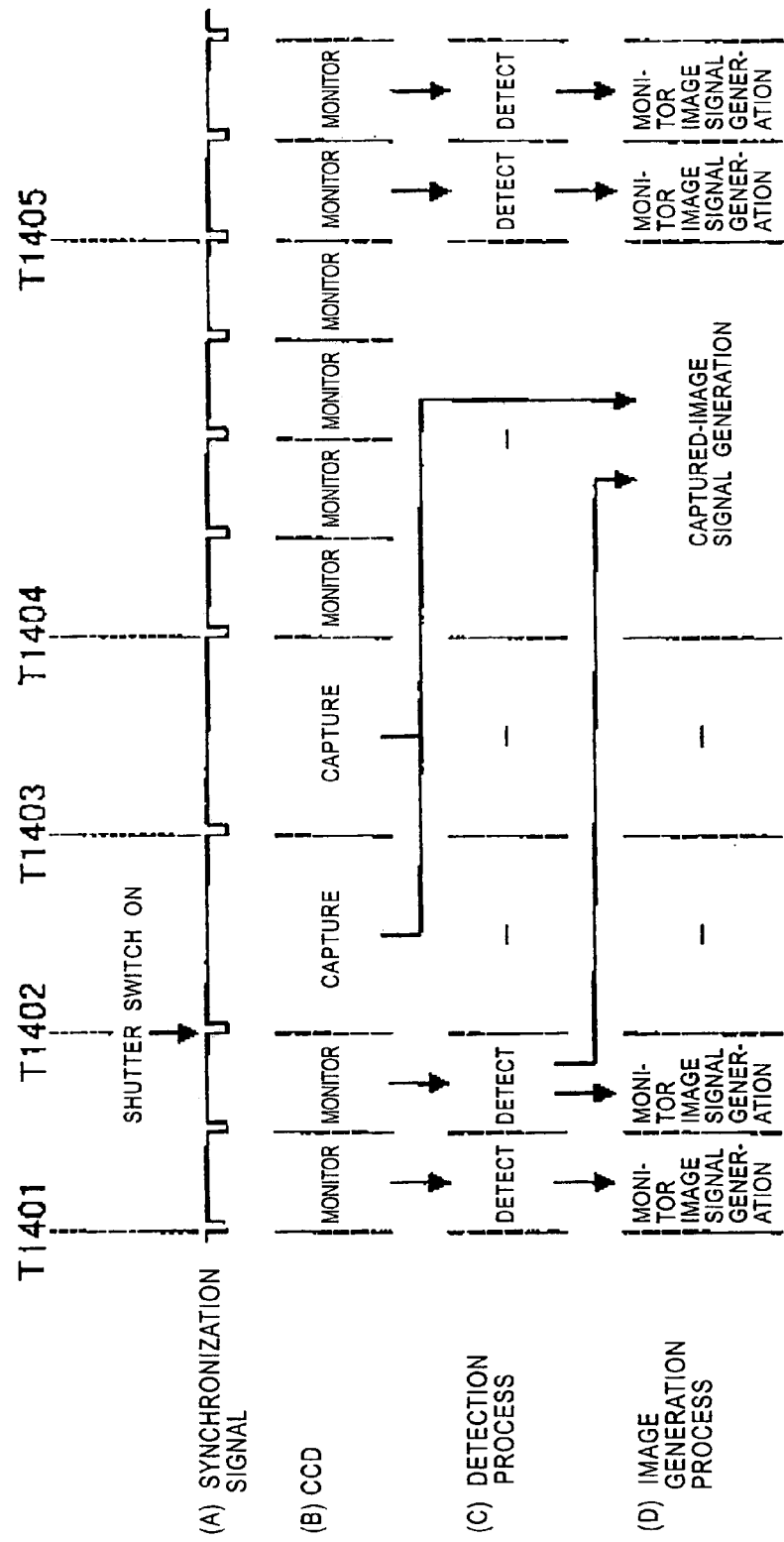
FIG. 14 schematically shows an example of signal processing as the reading operation mode shifts in a conventional digital still camera.

FIG. 8 shows a case in which a CCD of the interlace scanning method is used as the image-capturing device 3. FIG. 8(A) shows a synchronization signal which is synchronized with the frame or the field. FIG. 8(B) shows the shift of the reading operation mode in the image-capturing device 3. FIGS. 8(C) and 8(D) show a detection process and an image generation process in the camera system LSI 6 for controlling AE, AWB, and DCLP, corresponding to the above shift, respectively. The detection process of FIG. 14(C) is a process performed in the detection processing circuit 63, and the image generation process of FIG. 14(D) is a process performed in the camera pre-processing circuit 64 and the camera main-processing circuit 65.

At timings T801 and T802, as shown in FIG. 8(B), the image-capturing device 3 operates in the monitor reading mode, and reading of signals in which pixels are thinned out is performed in synchronization with the synchronization signal. The image signal obtained in the monitor reading mode is supplied to the front end 5 via the amplifier 4, whereby the image signal is converted into digital data. Thereafter, a detection process for control of AE, AWB, and DCLP is performed in the detection processing circuit 63 of the camera system LSI 6. The data obtained by this detection process is passed to the microcomputer 9, whereby coefficients for control of AE, AWB, and DCLP are computed and are output to the camera pre-processing circuit 64 of the camera system LSI 6.

As shown in FIG. 8 (D), in the camera pre-processing circuit 64, based on the data output from the microcomputer 9, a process for generating an image signal for monitoring by the user (hereinafter referred to as a "monitor image signal") is started. In the camera pre-processing circuit 64, based on the coefficients computed in the microcomputer 9, an appropriate image-quality correction process is performed on the image signal obtained in the monitor reading mode. Furthermore, for the control of AE, based on the computed result, control of the iris 2b, the front end 5, etc., is also performed by the microcomputer 9. The image signal output from the camera pre-processing circuit 64 is further converted into a luminance signal and color-difference signals in the camera main-processing circuit 65, and a monitor image signal is generated.

The generated monitor image signal is stored in the image memory 7 under the control of the memory controller 66, after which the image signal is output to, for example, the display block, and the image signal is displayed on the display device such as an LCD. This display image is monitored by the user. Since the display image at this time is based on the image signal generated by thinned-out reading of pixels in the image-capturing device 3, the display image is displayed at a high frame rate. Furthermore, when an addition process for the lines of the same color in the vertical direction is performed, and the image signal is output in the image-capturing device 3, aliasing noise in the image is reduced.

Next, at timing T802, when a request for generating a captured image is supplied to the microcomputer 9 as a result of, for example, the shutter switch being pressed by the user, as shown in FIG. 8(B), the image-capturing device 3 shifts to the capture reading mode, and the shutter 2c operates under the control of the microcomputer 9. In the image-capturing device 3, first, reading of signals for all the pixels, for example, of the odd-numbered lines in the horizontal direction is performed. At the subsequent timing T803, reading of signals for all the pixels of the even-numbered lines is performed.

In this capture reading mode, since pixels are not thinned out, the interval of the synchronization signal increases. The image signal obtained in the capture reading mode is converted into digital data by the front end 5 via the amplifier 4, after which the digital data is temporarily stored at a predetermined address of the image memory 7 under the control of the memory controller 66 of the camera system LSI 6.

Next, at timing T804, the image-capturing device 3 returns to the monitor reading mode. Furthermore, along with this, the image signal obtained in the capture reading mode is read from the image memory 7 under the control of the memory controller 66, and the image signal is supplied to the camera system LSI 6. In the camera system LSI 6, as a result of the data bus selector 61 being switched, the image signals containing all the pixel signals, stored in the image memory 7, are supplied to the detection processing circuit 63.

Here, the memory controller 66 reads the stored image signal by thinning out pixels in such a manner that the function of the thinning-out/addition circuit 66a controls the address of reading the image memory 7. In this thinned-out reading, a match is made with the positions of the pixels to be read and pixel coding when the image signal is to be read in the image-capturing device 3 in the monitor reading mode. Furthermore, when the image-capturing device 3 has performed line addition in the vertical direction and has output pixel signals, the thinning-out/addition circuit 66a performs an addition process so that the line addition in the image-capturing device 3 matches the pixel positions with regard to the pixel signal in which thinning-out reading is performed, and outputs the signal to the detection processing circuit 63 via the data bus selector 61.

The detection processing circuit 63 performs a detection on the supplied image signal, and outputs the detected result to the microcomputer 9. Then, at the subsequent timing T805, computations for various coefficients for image-quality correction based on this detected result is performed by the microcomputer 9. Here, the microcomputer 9 computes various coefficients by using both the detected data detected in the capture reading mode and the detected result using the image signal in the monitor reading mode prior to timing T802 at which the shutter switch was pressed.

At the subsequent timing T806, the various computed coefficients are supplied from the microcomputer 9 to the camera pre-processing circuit 64. Along with this, the image signal stored in the image memory 7 is read again under the control of the memory controller 66, and is supplied to the camera pre-processing circuit 64 via the data bus selector 61. At this time, the memory controller 66 reads all the pixel data of the image signal without using the function of the thinning-out/addition circuit 66a. This starts a process for generating an image signal for recording (hereinafter referred to as a "captured image signal") on an external recording medium.

In the camera pre-processing circuit 64, based on the various coefficients from the microcomputer 9, an image-quality correction process is performed on the input image signal on which thinning-out and line addition have not been performed. In this image-quality correction process, exposure, white balance correction, elimination of offset, etc., are performed. Furthermore, this image signal is supplied to the camera main-processing circuit 65, whereby a pixel interpolation process is performed thereon, and the signal is converted into a luminance signal and color-difference signals, thereby generating a captured image signal.

The generated captured image signal is supplied to the memory controller 66 via the data bus selector 62, and the image signal is stored at a predetermined address of the image memory 7 under the control of the memory controller 66. Furthermore, the stored captured image signal is read again and is subjected to, for example, a resolution conversion process and a data compression process, and the image signal is transferred to an external recording medium, etc.

Thereafter, at timing T807, in the camera system LSI 6, the captured-image signal generation process is terminated, and a detection for the image signal obtained in the monitor reading mode is started again.

In such a process for the image signal generated in the capture reading mode, an image-quality correction process in the camera pre-processing circuit 64 is performed based on the data detected by the detection processing circuit 63 in the monitor reading mode prior to the capture reading mode and the data which is obtained by detecting the image signal read in the capture reading mode. Therefore, it becomes possible to perform image-quality correction for the captured image signal by considering the difference in the image state of each image signal generated in the monitor reading mode and the capture reading mode.

For example, as the image-capturing device 3 comes to have a larger number of pixels, in the capture reading mode, the time it takes to read all the pixels increases, and a large offset may occur in the image signal. In the above-described processing, since this offset can be detected, an appropriate offset elimination process using DCLP can be performed in the camera pre-processing circuit 64, making it possible to improve the image quality.

Furthermore, in the monitor reading mode, there are cases in which a smear occurs in the image signal. This smear does not ordinarily occur in the capture reading mode. In the above-described processing, since the difference in the image signal in each reading mode due to the occurrence of smear can be detected, it becomes possible to perform image-quality correction according to this difference.

Furthermore, when the image-capturing apparatus 1 is provided with a strobe mechanism, this strobe mechanism ordinarily operates only in the capture reading mode. Therefore, in the above-described processing, since the difference in the image signal due to the presence or absence of the strobe mechanism actuation can be detected, in the camera pre-processing circuit 64, appropriate exposure correction and white balance correction according to this difference can be performed.

Furthermore, since thinned-out reading of the image signal stored in the image memory 7 can be performed by the thinning-out/addition circuit 66a of the memory controller 66, the amount of data of the image signal to be supplied to the detection processing circuit 63 is reduced, and thus the time it takes to perform a detection process can be shortened.

In the monitor reading mode, in order to reduce aliasing noise which occurs conspicuously as the thinning-out ratio increases, the image-capturing device 3 sometimes performs line addition in the vertical direction. Similar line addition can be performed by the thinning-out/addition circuit 66a on the signal read from the image memory 7, and the signal can be supplied to the detection processing circuit 63. Therefore, a detection of each image signal in the monitor reading mode and in the capture reading mode becomes possible with the signal level, which is a reference, being matched, and thus accurate image-quality correction can be performed.

Furthermore, thinned-out reading and line addition processes in the thinning-out/addition circuit 66a allow detection of an image signal generated in the capture reading mode and an image signal generated in the monitor reading mode to be performed with the pixel thinned-out position, the pixel coding, and the signal level which is a reference being matched. Therefore, there is no need to make a large system change for the detection processing circuit 63 and the camera pre-processing circuit 64 in comparison with a conventional case, and the image quality of the generated image signal can be improved.

When an image signal is read from the image memory 7 and is supplied to the detection processing circuit 63, the signals of all the pixels may be supplied to the detection processing circuit 63 without performing thinned-out reading in the thinning-out/addition circuit 66a. In this case, since image-quality correction can be performed based on the detection of all the pixels in the image signals which are read in the capture reading mode, it is possible to improve the accuracy of image-quality correction. However, in this case, higher processing performance is required for the detection processing circuit 63 and the microcomputer 9, and the manufacturing cost is increased.

A description will now be given below of a detection process and an image-quality correction process on an image signal. In the following, a description is given of a case in which a primary color single-plate CCD is used as the image-capturing device 3.

In the detection processing circuit 63, mainly, detected data for control of AE, AWB, and DCLP is computed. Of the detected data for AE among the above data, a detection frame in the input image signal is set in advance, the luminance signal level within this detection frame is integrated for all the pixels, and this integrated value is output to the microcomputer 9. For the luminance signal level, for example, the average value of the four colors of R, Gr, Gb, and B is used. Furthermore, for the detected data for AWB, the signal level for each color in the detection frame is integrated for all the pixels in the detection frame, and the integrated value of each color is output to the microcomputer 9. Furthermore, for the detected data for DCLP, the offset level of each color in the OPB area in the image signal is integrated, and this integrated value is output to the microcomputer 9.

The microcomputer 9 computes each of the coefficients for AE, AWB, and DCLP as the control values for image-quality correction, and sends them to the camera pre-processing circuit 64 of the camera system LSI 6. Furthermore, in the monitor reading mode, for AE, the coefficient is not sent to the camera pre-processing circuit 64, and the iris 2b, the S/H and GC circuit 5a of the front end 5, and the TG 8 are controlled so as to make the optimum exposure.

Figure 9:
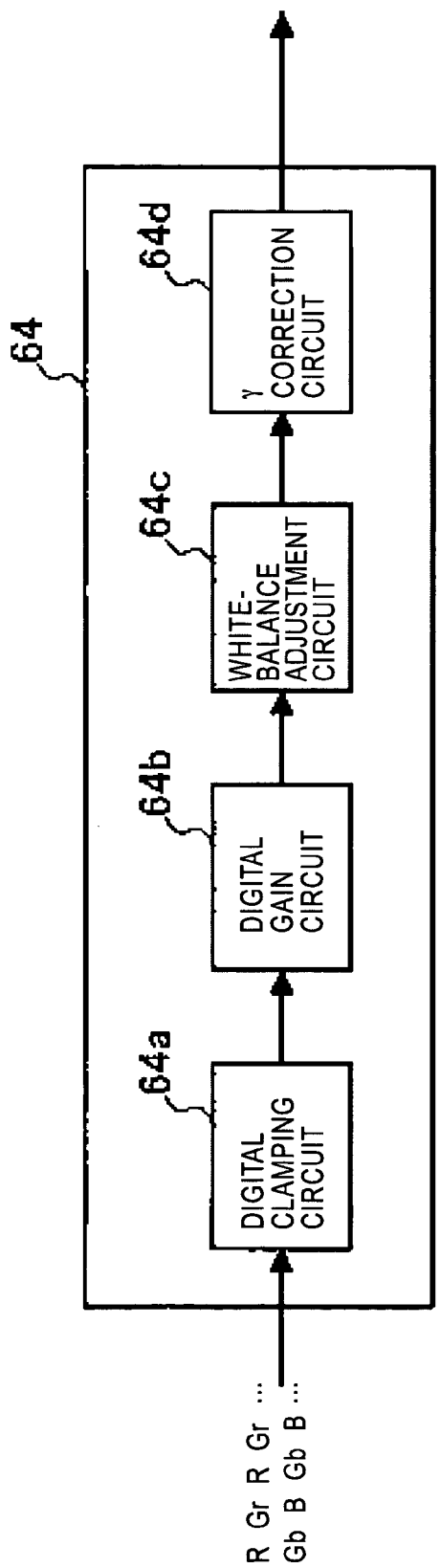
FIG. 9 is a block diagram showing an example of the internal configuration of a camera pre-processing circuit.

Here, the outline of the image-quality correction process in the camera pre-processing circuit 64 will now be described. FIG. 9 is a block diagram showing an example of the internal configuration of the camera pre-processing circuit 64.

The camera pre-processing circuit 64 comprises a digital clamping circuit 64a for eliminating offset contained in an input image signal, a digital gain circuit 64b for adjusting the signal level in order to correct exposure, a white-balance adjustment circuit 64c for adjusting white balance, and a γ correction circuit 64d for performing γ correction.

For the γ correction circuit 64d among the above circuits, a circuit having the same configuration as that used conventionally can be used. In the capture reading mode, when the thinning-out/addition circuit 66a of the memory controller 66 is made to function to read an image signal, circuits having the same configuration as that of the conventional case can be used for the digital clamping circuit 64a and the white-balance adjustment circuit 64c. The digital gain circuit 64b is a circuit that is newly provided in the present invention, as will be described later.

Figure 10:
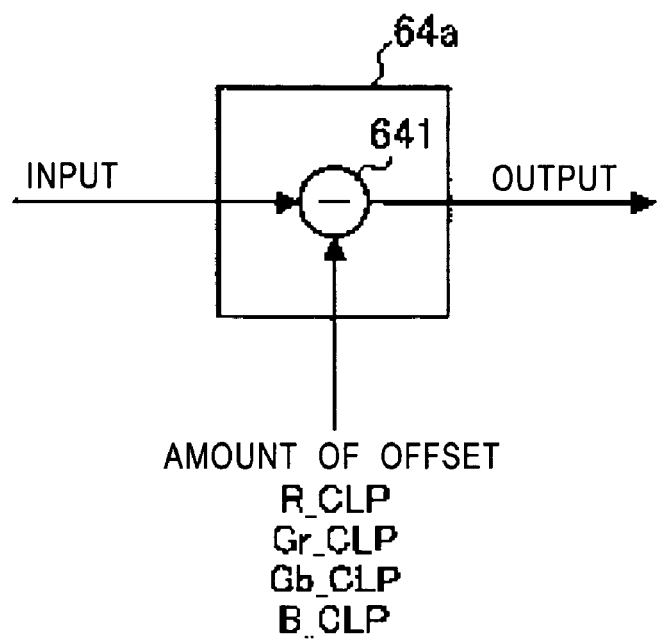
FIG. 10 shows an example of the configuration of a digital clamping circuit.

FIG. 10 shows an example of the configuration of the digital clamping circuit 64a.

As shown in FIG. 10, the digital clamping circuit 64a is formed of a subtraction circuit 641 for subtracting the amount of offset computed by the microcomputer 9 from each color signal level in the input image signal. In the microcomputer 9, as the offset level for each color, values of coefficients R_CLP, Gr_CLP, Gb_CLP, and B_CLP are computed for each pixel. The digital clamping circuit 64a subtracts the value of each coefficient received from the microcomputer 9 from the input image signal. As a result, an offset, due to mainly a dark signal, contained in the image signal which is read in the capture reading mode, is removed.

Figure 11:
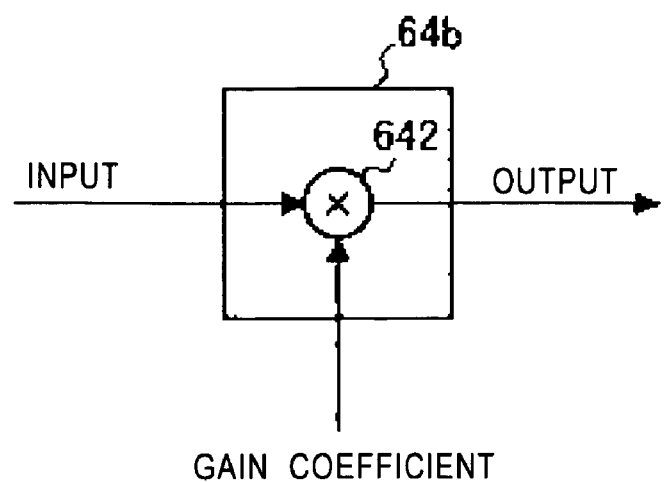
FIG. 11 shows an example of the configuration of a digital gain circuit.

FIG. 11 shows an example of the configuration of the digital gain circuit 64b.

As shown in FIG. 11, the digital gain circuit 64b is formed of a multiplication circuit 642 for multiplying all the colors computed by the microcomputer 9 with respect to the signal level of the input image signal by a fixed gain coefficient.

Here, the image signal supplied in the capture reading mode has been subjected to exposure correction in such a manner that the opening of the iris 2b, the exposure time by the shutter 2c, and gain adjustment by the front end 5 are made. Therefore, by newly providing the digital gain circuit 64b, based on the image signal in the capture reading mode, the signal level of each color of the input image signal is multiplied by a constant gain coefficient, thereby performing further correction for the brightness. As a result, it becomes possible to correct the difference in brightness of the image as a result of using, for example, a strobe function.

Figure 12:
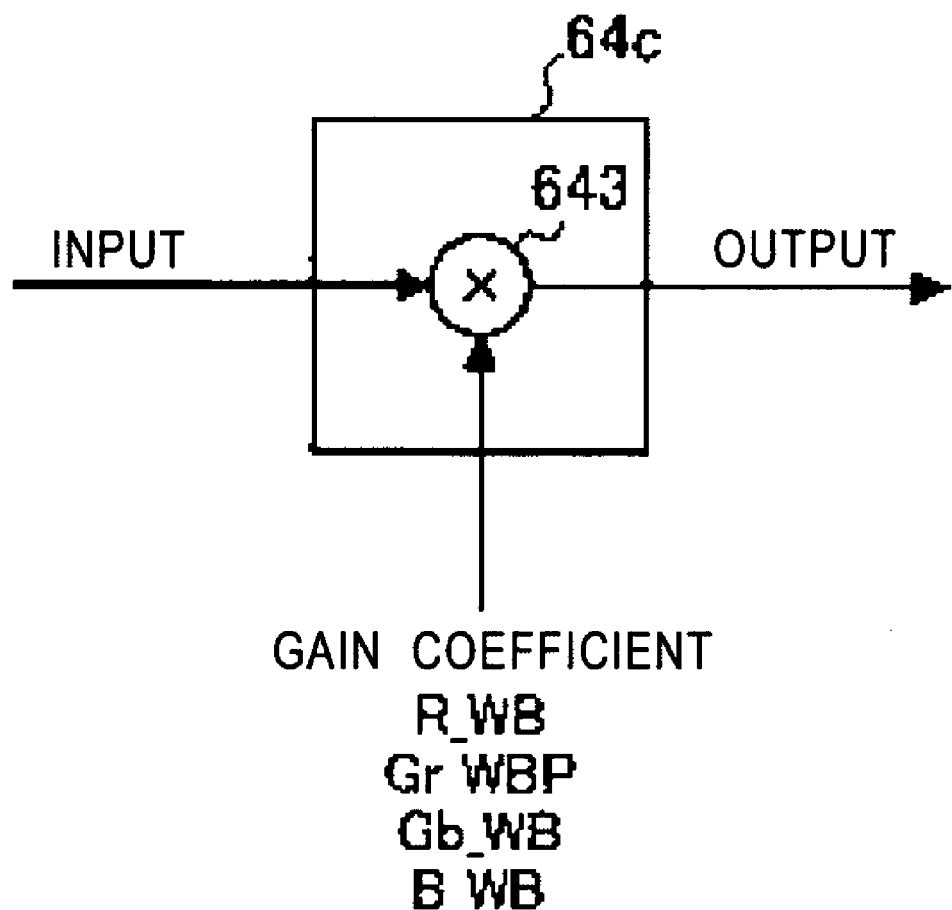
FIG. 12 shows an example of the configuration of a white-balance adjustment circuit.

FIG. 12 shows an example of the configuration of the white-balance adjustment circuit 64c.

As shown in FIG. 12, the white-balance adjustment circuit 64c is formed of a multiplication circuit 643 for multiplying the signal level of each color in the input image signal by the WB coefficient computed by the microcomputer 9. In the microcomputer 9, as the WB coefficient for each color, values R_WB, Gr_WB, Gb_WB, and B_WB are computed for each pixel. The white-balance adjustment circuit 64c multiplies the input image signal by the value of each coefficient received from the microcomputer 9. As a result, it becomes possible to correct the difference of the color in the image due to using, for example, a strobe function.

The digital clamping circuit 64a and the white-balance adjustment circuit 64c can also be realized in the same circuit. The γ correction circuit 64d performs a non-linear signal conversion process on the signal level of each color of the input image signal by, for example, reference to an LUT (Look-Up Table), by a method of folding approximation, etc.

Figure 13:
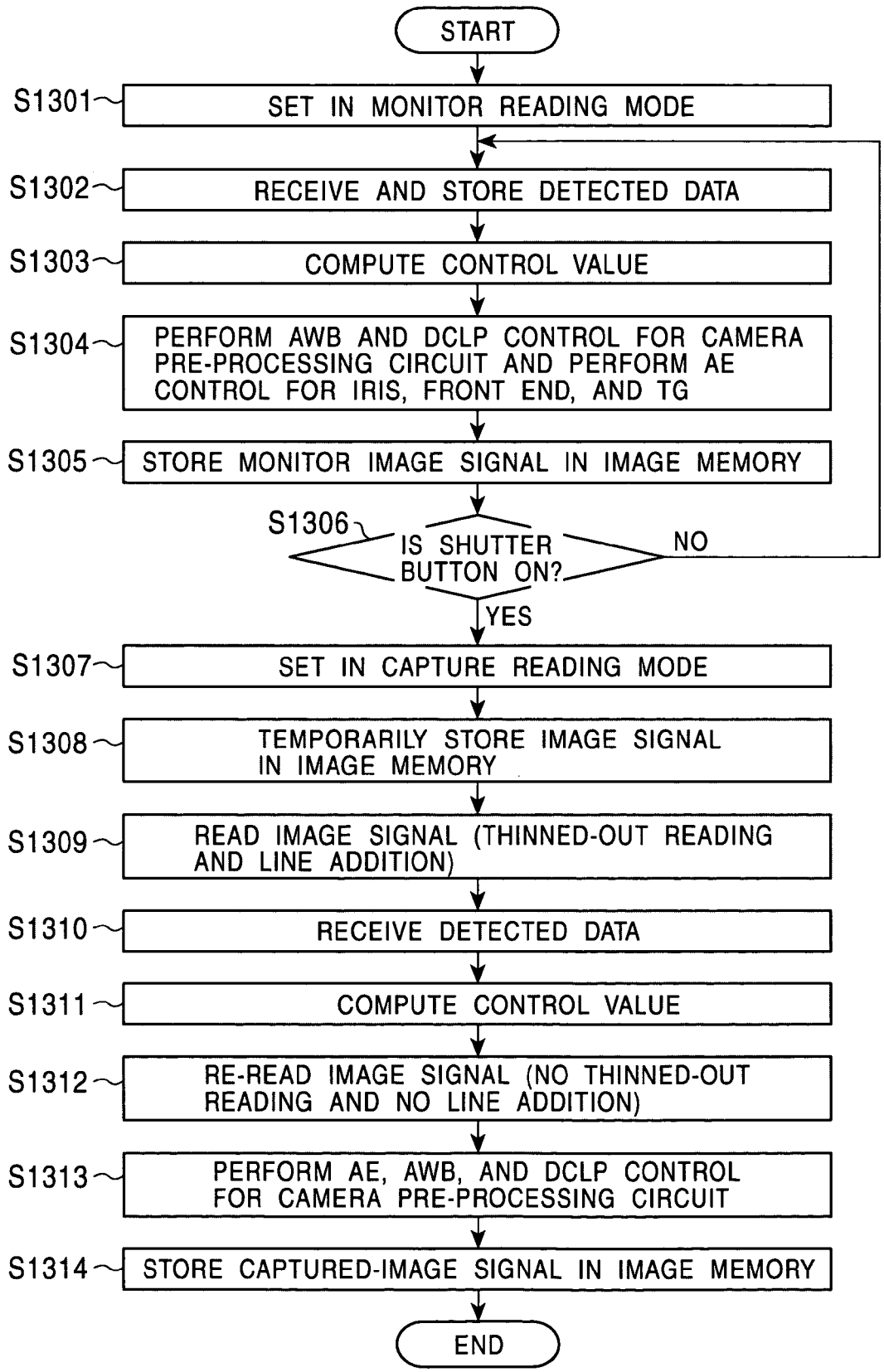
FIG. 13 is a flowchart showing the operation of a microcomputer when an image is captured.

FIG. 13 is a flowchart showing the operation of the microcomputer 9 when an image is captured.

In step S1301, the image-capturing device 3 and the TG 8 are set in the monitor reading mode. In the image-capturing device 3, in accordance with this setting, an image signal in which thinned-out reading of pixels and line addition in the vertical direction have been performed is output. At this time, the microcomputer 9 causes the lens 2a, the iris 2b, and the front end 5 to operate in accordance with the initial setting or in accordance with the previously used setting. Furthermore, the microcomputer 9 controls the data bus selector 61, so that the image signal input to the camera system LSI 6 via the front end 5 is input to the detection processing circuit 63, whereby the image signal is detected.

In step S1302, the detected data from the detection processing circuit 63 is received. Furthermore, the received detected data is stored in preparation for future use during the capture reading mode. In step S1303, based on the received detected data, various coefficients for AE, AWB, and DCLP are computed as control values for image-quality correction. At this time, the computation of a control value for AF (Auto Focus) is also performed.

In step S1304, the computed results of the control values are output, and the control of the AWB and DCLP functions for the camera pre-processing circuit 64 is performed. Furthermore, as AE control, the operation control of the iris 2b, the front end 5, and the TG 8 is performed. Furthermore, AF control for the lens 2a is performed. The image signal whose image quality is corrected by the camera pre-processing circuit 64 is further subjected to a process for conversion into a luminance signal and color-difference signals in the camera main-processing circuit 65, and the image signal is output as a monitor image signal.

In step S1305, the data bus selector 62 and the memory controller 66 are controlled so that the generated monitor image signal is stored in the image memory 7. Thereafter, the stored monitor image signal is read, and the image signal is sent to the display block (not shown), whereby the captured image is displayed on the display device.

In step S1306, a determination is made as to whether or not, for example, the shutter button (not shown) is turned on. When the shutter button is not on, the process returns to step S1302, where an image-quality correction process for the image signal in the monitor reading mode is repeatedly performed, and the monitor image signal is generated in sequence. As a result, the optimum control for AE, AWB, DCLP, and AF is performed on the image signal of a high frame rate, which is obtained by thinned-out reading in the image-capturing device 3. When it is determined in step S1306 that the shutter button is turned on, the process proceeds to step S1307.

In step S1307, the image-capturing device 3 and the TG 8 are set in the capture reading mode. As a result, the shutter 2c operates, and in the image-capturing device 3, reading of the stored charge of all the pixels is performed. In the case of the interlace scanning method, the stored charge of all the pixels is read by two scannings. At this time, line addition in the vertical direction is not performed. In step S1308, the data bus selector 62 is switched, and by controlling the memory controller 66, the image signal output from the front end 5 is temporarily stored in the image memory 7.

In step S1309, the data bus selector 61 is switched, and by controlling the memory controller, the image signal which is temporarily stored in the image memory 7 is read, and the image signal is input to the detection processing circuit 63, whereby the image signal is detected. At this time, the thinning-out/addition circuit 66a in the memory controller 66 is made to function, and in accordance with the function in the image-capturing device 3 during the memory reading mode, thinned-out reading and line addition are performed on the image signal.

In step S1310, the detected data from the detection processing circuit 63 is received. In step S1311, based on the received detected data, a control value for image-quality correction is computed. At this time, for example, the coefficient for DCLP is computed based on only the detected data which is received at this time, and the AE and AWB coefficients are computed by referring to this detected data and the detected data which is stored during the monitor reading mode prior to that of the above detected data.

In step S1312, by controlling the memory controller 66, the image signal which is temporarily stored in the image memory 7 is read again, and the image signal is input to the camera pre-processing circuit 64. At this time, the function of the thinning-out/addition circuit 66a in the memory controller 66 is cancelled, and the image signals for all the pixels are read.

In step S1313, various computed coefficients are output to the camera pre-processing circuit 64, and control of the AE, AWB, and DCLP functions in the camera pre-processing circuit 64 is performed. As a result, exposure, white balance, and correction for offset with respect to the image signal in which pixels are not thinned out is performed. Furthermore, in the camera main-processing circuit 65, a process for separation into a luminance signal and color-difference signals is performed, and a captured image signal is generated.

In step S1314, by controlling the memory controller 66, the generated captured image signal is stored in a predetermined area of the image memory 7. Thereafter, the stored captured image signal is read, the signal is transferred to a processing block for a resolution conversion process, etc., a data compression process, etc., and the image signal is transferred to an external recording medium (not shown).

In step S1311 of the above-described flowchart, in the microcomputer 9, each coefficient for AE and AWB may be computed using only the detected data in the capture reading mode. However, by using the detected data in the monitor reading mode prior to the capture reading mode, the image quality of the image signal in the capture reading mode can be estimated to a certain degree, and the accuracy of image-quality correction can be improved efficiently.

As has thus been described, in the image-capturing apparatus of the present invention, in the second reading operation mode, an image signal which is read from solid-state image-capturing elements without being thinned out is supplied to detection means, whereby a detection is performed thereon. Therefore, since signal processing means performs signal processing for image-quality correction of this image signal on the basis of the detection for the image signal which is read in the second reading operation mode, it is possible to properly perform image-quality correction even when the number of pixels possessed by the solid-state image-capturing elements is large.

Furthermore, for example, during the second reading operation mode, when the image signal stored in the temporary storage means is read and is supplied to the detection means, the reading control means may read the image signal by thinning out the pixels in such a manner as to correspond to the reading from the solid-state image-capturing elements during the first reading operation mode. As a result, the time required for detection is shortened, and each function can be realized without greatly changing the configuration of the detection means and the signal processing means in comparison with that of the conventional case.

In the image-quality correction method of the present invention, when the solid-state image-capturing elements shift from the first reading operation mode to the second reading operation mode, a predetermined detection is performed on the image signal which is read without being thinned out from the solid-state image-capturing elements. Therefore, since predetermined signal processing for image-quality correction is performed based on the detection for the image signal which is read in the second reading operation mode, it is possible to suitably perform image-quality correction even when the number of pixels possessed by the solid-state image-capturing elements is large.

Furthermore, for example, when an image signal which is temporarily stored is read and a predetermined detection is performed thereon, the image signal may be read by thinning out pixels in such a manner as to correspond to the reading from the solid-state image-capturing elements during the first reading operation mode. As a result, the time required for detection is shortened, and each function can be realized without greatly changing the configuration of the detection means and the signal processing means in comparison with that of the conventional case.

The invention claimed is:

1. An image-capturing apparatus for capturing an image of a subject, said image-capturing apparatus comprising:
solid-state image-capturing elements arranged in matrix comprising a first reading operation mode in which a captured-image signal is read by thinning out pixels, and a second reading operation mode in which the captured image signal is read without thinning out pixels;
temporary storage means for temporarily storing an image signal read from said solid-state image-capturing elements during said second reading operation mode;
detection means for performing a predetermined detection for said image signal read from said solid-state image-capturing elements during said first reading operation mode and performing a predetermined detection on said image signal read from said temporary storage means during said second reading operation mode;
signal processing means for performing predetermined signal processing for correcting image quality on the basis of the data detected by said detection means during each of said reading operation modes, on said image signal read from said solid-state image-capturing elements during said first reading operation mode and on said image signal read from said temporary storage means during said second reading operation mode; and
reading control means for, when the solid-state image-capturing elements shift from said first reading operation mode to said second reading operation mode, reading said image signal stored in said temporary storage means and supplying the image signal to said detection means, thereafter, re-reading said image signal, and supplying the image signal to said signal processing means.

2. An image-capturing apparatus according to claim 1, wherein said reading control means reads said image signal stored in said temporary storage means by thinning out pixels in such a manner as to correspond to the reading from said solid-state image-capturing elements during said first reading operation mode, and supplies the image signal to said detection means.

3. An image-capturing apparatus according to claim 1, wherein, during said second reading operation mode, said signal processing means performs said predetermined signal processing on the basis of said detected data detected in said detection means and said detected data obtained during said first reading operation mode prior to shifting to said second reading operation mode.

4. An image-capturing apparatus according to claim 1, wherein said solid-state image-capturing elements comprise first signal addition means for adding signals of a plurality of pixels in the lines of the same color in the vertical direction and reading them during said first reading operation mode, and said reading control means comprises second signal addition means for adding signals for the pixels corresponding to said first signal addition means to said image signal read from said temporary storage means during said second reading operation mode and supplying the signals to said detection means.

5. An image-capturing apparatus according to claim 1, wherein said signal processing means adjusts white balance on said input image signal on the basis of the data detected by said detection means.

6. An image-capturing apparatus according to claim 1, wherein said signal processing means performs an offset elimination process on said input image signal on the basis of the data detected by said detection means.

7. An image-capturing apparatus according to claim 1, wherein said signal processing means performs gain adjustment on said input image signal on the basis of the data detected by said detection means.

8. An image-capturing method for capturing an image of a subject by using solid-state image-capturing elements, said image-quality correction method comprising the steps of:

performing a predetermined detection on an image signal which is read from said solid-state image-capturing elements in a first reading operation mode in which said image signal captured by said solid-state image-capturing elements is read by thinning out pixels;

performing predetermined signal processing for correcting image quality on said image signal on the basis of the data detected by said predetermined detection;

temporarily storing said image signal read from said solid-state image-capturing elements when said solid-state image-capturing elements shift to a second reading operation mode without thinning out said pixels;

reading said stored image signal and performing said predetermined detection thereon; and re-reading said stored image signal and performing predetermined signal processing for image-quality correction on said re-read image signal on the basis of the data detected by said predetermined detection.

9. An image-capturing method according to claim 8, wherein, during said second reading operation mode, when said image signal which is temporarily stored is to be read and said predetermined detection is to be performed thereon, said image signal is read by thinning out pixels in such a manner as to correspond to the reading from said solid-state image-capturing elements during said first reading operation mode.

* * * * *